United States Patent
Park et al.

(10) Patent No.: US 9,151,369 B2
(45) Date of Patent: Oct. 6, 2015

(54) AEROSTATIC AIR BEARING, ASSEMBLING METHOD THEREOF, AND AEROSTATIC LEAD SCREW ACTUATOR USING THE SAME

(71) Applicant: KOREA INSTITUTE OF MACHINERY & MATERIALS, Daejeon (KR)

(72) Inventors: Jong-Kweon Park, Daejeon (KR); Seung Kook Ro, Daejeon (KR); Gyung Ho Khim, Daejeon (KR); Shiv G. Kapoor, Champaign, IL (US); James Zhu, Urbana, IL (US)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 227 days.

(21) Appl. No.: 13/919,072

(22) Filed: Jun. 17, 2013

(65) Prior Publication Data
US 2014/0366663 A1    Dec. 18, 2014

(51) Int. Cl.
| F16H 25/12 | (2006.01) |
| F16H 25/24 | (2006.01) |
| F16C 29/02 | (2006.01) |
| F16C 32/06 | (2006.01) |

(52) U.S. Cl.
CPC .............. *F16H 25/12* (2013.01); *F16H 25/24* (2013.01); *F16C 29/025* (2013.01); *F16C 32/0614* (2013.01); *F16C 32/0666* (2013.01); *Y10T 29/49639* (2015.01); *Y10T 74/18736* (2015.01)

(58) Field of Classification Search
CPC ....... F16H 25/12; F16H 25/24; F16C 29/025; F16C 32/0614; F16C 32/0666
USPC .................................. 74/89.43; 384/12, 121
See application file for complete search history.

(56) References Cited

U.S. PATENT DOCUMENTS

| 4,447,770 A |   | 5/1984  | Shepherd |
| 4,776,229 A | * | 10/1988 | Zona ............................ 74/89.43 |
| 4,793,201 A |   | 12/1988 | Kanai |
| 4,836,042 A |   | 6/1989  | Slocum |
| 5,090,265 A |   | 2/1992  | Slocum |
| 6,086,582 A | * | 7/2000  | Altman et al. .................. 606/41 |
| 6,515,288 B1 | * | 2/2003 | Ryding et al. ........... 250/441.11 |
| 7,284,907 B2 | * | 10/2007 | Ruijl .............................. 384/12 |
| 7,311,036 B2 | * | 12/2007 | Uchino ....................... 92/165 R |

FOREIGN PATENT DOCUMENTS

KR    10-2006-0009505    2/2006

OTHER PUBLICATIONS

Takkakaw et al., "Ultra Precision Positioning Using Air Bearing Lead Screw," Transactions of the Japan Society of Mechanical Engineers, vol. 66, No. 645, pp. 1559-1566, May 25, 2000.
James Zhu et al., "The Manufacture of a Porous-Restricted Aerostatic Lead Screw Actuator for High Performance Micro-Scale Machine Tools," IWMF2012, 8th International Workshop on Microfactories, Tampere, Finland (Jun. 18, 2012).

* cited by examiner

*Primary Examiner* — William Kelleher
*Assistant Examiner* — Bobby Rushing, Jr.
(74) *Attorney, Agent, or Firm* — Lex IP Meister, PLLC

(57) ABSTRACT

Disclosed is an aerostatic air bearing. The disclosed aerostatic air bearing includes: an aerostatic nut, said aerostatic nut including a housing having an air inlet disposed therein, a helical plenum chamber disposed in said housing, said helical plenum chamber being fluidly connected to the air inlet and fluidly interconnecting a plurality of openings, said openings being disposed in a helical pattern, and a plurality of porous media, each of said porous media being disposed in one of the plurality of openings respectively; and a lead screw coupled to said aerostatic nut, said lead screw including a threaded surface separated from each of the plurality of porous media.

10 Claims, 5 Drawing Sheets

AEROSTATIC AIR BEARING, ASSEMBLING METHOD THEREOF, AND AEROSTATIC LEAD SCREW ACTUATOR USING THE SAME

BACKGROUND OF THE INVENTION (a) Field of the Invention

Exemplary embodiments relate to an aerostatic air bearing, an assembling method thereof, and an aerostatic lead screw actuator using the aerostatic air bearing.

(b) Description of the Related Art

Miniaturization technologies have placed new challenges on the world of manufacturing. Micro-scale machine tools (mMTs) have recently emerged as a viable and economic option to address these challenges.

However, evolving applications for mMTs have begun to include materials that are difficult to machine. For example, hard turning and micro-machining of titanium, stainless steels, and bulk metallic glass are just some challenges faced by mMTs.

These applications require increased static/dynamic stiffness and high damping in the actuators used in mMTs. A prior solution for linear positioning, ball screws, does not generally achieve the positioning accuracy required for mMTs.

Hydrostatic lead screw actuators and aerostatic lead screw actuators have been developed for use in mMTs. Hydrostatic screws are messy and require significant support equipment.

Aerostatic lead screw actuators (ALSAs) have the potential to provide the necessary stiffness as well as extremely high positioning accuracy. ALSAs use an air film in place of balls to transmit the load from the nut (aerostatic lead screw actuators (ALSAs)) to the screw. ALSAs also eliminate backlash and stick-slip friction and therefore appear to be particularly suitable for high performance mMTs. The major challenge posed in the manufacture of an ALSA, however, is maintaining the precise air gap between the screw and the nut over the entire helical threaded surface.

In the art, both orifice-restricted and porous-restricted air bearings have been incorporated in aerostatic lead screw designs. For example, Tachikawa et al., "Ultra Precision Positioning Using Air Bearing Lead Screw," Transactions of the Japan Society of Mechanical Engineers, Vol. 66, No. 645, pp. 1559-1566, 2000, disclose a porous-restricted aerostatic lead screw actuator that achieves 10 nm positioning accuracy. However, this lead screw actuator design provides relatively low stiffness (e.g., 30 N/micron), and requires thread engagement with eight thread revolutions, which significantly increases manufacturing costs.

A design and manufacturing method for a groove-fed orifice-restricted ALSA is disclosed in U.S. Pat. No. 4,836,042 by Slocum et al. Due to the special nature of the thread design in the '042 patent, however, any inaccuracy in the thread profile doubles the error seen in the air gap.

U.S. Pat. No. 5,090,265 by Slocum et al. discloses the use of a hydrostatic lead screw actuator that does not require precise air gap control. The manufacturing process is based on machining both the thread and the nut on the same machine to maximize the repeatability of cutting operations. In the '265 patent, which describes a design and manufacturing method for an orifice-restricted fluid-based lead screw actuator, high pressure air, oil, and other fluids provide a working fluid. The lead screw actuator focuses on orifice-restriction as the primary method to control air flow. These orifices feed grooves that distribute air to the entire thread flank of the lead screw to create an air gap between the nut and the screw.

However, such a focus on orifice-restriction to control airflow is highly susceptible to instability and vibration. Further, the lead screw actuator in the '265 patent is limited to a square thread form, which is not an industry standard. Also, using the manufacturing method presented in the '265 patent, any inaccuracy in the thread profile is doubled where the air gap is concerned. For example, if the thread flank has a slight angle creating an error of 0.5 microns at the outer diameter, this will create an error of 1 micron in the air gap. This property effectively forces the tolerance requirements on a screw made in this way to be halved, thereby increasing manufacturing costs. Still further, using fluids other than air for the '265 patent device requires considerable fluid support equipment, which is less desirable for machine tool applications such as MMT applications.

SUMMARY OF THE INVENTION

An embodiment of the invention provides an aerostatic lead screw actuator (ALSA) assembly with high stiffness and near-frictionless motion.

An exemplary aerostatic lead screw actuator is a near-frictionless apparatus that converts rotary motion of a lead screw to linear motion of an aerostatic nut.

According to one aspect of the present invention, an aerostatic air bearing disclosed herein includes: an aerostatic nut, said aerostatic nut including a housing having an air inlet disposed therein, a helical plenum chamber disposed in said housing, said helical plenum chamber being fluidly connected to the air inlet and fluidly interconnecting a plurality of openings, said openings being disposed in a helical pattern, and a plurality of porous media, each of said porous media being disposed in one of the plurality of openings respectively; and a lead screw coupled to said aerostatic nut, said lead screw including a threaded surface separated from each of the plurality of porous media.

The plurality of openings may be formed as pairs on the opposing faces of the aerostatic nut.

Each of the plurality of porous media may be configured to have a disk shape.

Each of the plurality of openings may be configured to have a circular shape.

Each of the plurality of porous media may be formed of a graphite material.

Each of the plurality of openings may include a seat on which each of the plurality of porous media is disposed.

The seat may include a flange formed in each of the plurality of openings.

The flange may be flexible.

An aerostatic air bearing may further include a plate spring provided between each of the plurality of porous media and the flange.

The thread profile of the lead screw may include a trapezoid shape.

According to other aspect of the present invention, an aerostatic lead screw actuator disclosed herein includes: a base, a lead screw including a threaded surface, said lead screw being rotatably coupled to said base, first and second guide rails coupled to said base and disposed on said base on opposing sides of said lead screw, respectively, wherein a lead screw axis of said lead screw and axes of said first and second guide rails are coplanar, an aerostatic nut, said aerostatic nut including a housing having an air inlet disposed therein, a helical plenum chamber disposed in said housing, said helical plenum chamber being fluidly connected to the air inlet and fluidly interconnecting a plurality of openings, said openings being disposed in a helical pattern, and a plurality of porous media, each of said porous media being disposed in one of the plurality of openings, respectively; and a motor coupled to said lead screw for actuating said lead screw.

The aerostatic lead screw actuator may include first and second air bushings fixedly coupled to the housing of the aerostatic nut, said first and second guide rails extending through said first and second air bushings, respectively.

The aerostatic lead screw actuator may include a lapping module provided on the lead screw to provide consistent lapping across faces of all porous media of the aerostatic nut.

The first and second guide rails may be held by a set of spreader bars that reference two shaft portions of the lead screw.

The set of spreader bars may align the first and second guide rails such that the axes of the first and second guide rails and that of the lead screw are on the same plane.

The aerostatic lead screw actuator may include two lapping outriggers attaching the housing of the aerostatic nut to the first and second guide rails, wherein the two lapping outriggers constrain tilt and yaw of the first and second guide rails during lapping operations.

According to another aspect of the present invention, a method for assembling an aerostatic air bearing disclosed herein includes: providing an aerostatic nut including a housing having an air inlet therein, and a helical plenum chamber disposed in said housing, said helical plenum chamber being fluidly connected to the air inlet and fluidly interconnecting a plurality of openings, said openings being disposed in a helical pattern; providing a lead screw including a threaded surface; providing a plurality of porous media; first lapping of each of the plurality of porous media against the threaded surface to mate each of the plurality of porous media to a helical thread form; inserting each of the plurality of porous media into each of said openings; and second lapping of each of the plurality of porous media.

During the first lapping, the plurality of porous media may be roughly lapped by sliding of the aerostatic nut on the lead screw in a state in which a rough grinding compound is applied.

During the second lapping, the plurality of porous media may be precisely lapped by sliding of the aerostatic nut on the lead screw freely in a state in which a grinding compound which is denser than the grounding compound used in the first lapping is applied.

The method for assembling an aerostatic air bearing may further include applying a surface restriction layer on the first lapped surfaces of the plurality of porous media.

An aerostatic lead screw actuator (ALSA) according to an embodiment of the invention provides high stiffness and near-frictionless motion.

Aerostatic lead screw actuators (ALSAs) according to an embodiment of the invention provide the necessary stiffness as well as extremely high positioning accuracy.

Aerostatic lead screw actuators (ALSAs) according to the embodiment of the invention virtually eliminate stick-slip friction and backlash, and provide sufficient stiffness to perform in mMT tools, while still allowing for looser manufacturing tolerances.

DETAILED DESCRIPTION OF THE EMBODIMENTS

Figure 1:
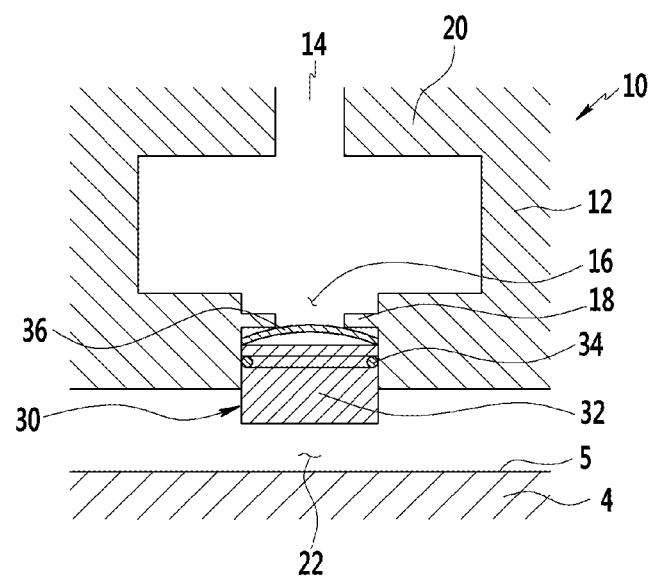
FIG. 1 shows an exemplary air bearing according to an embodiment of the invention.

Exemplary embodiments will be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. The drawings and description are to be regarded as illustrative in nature and not restrictive. Like reference numerals designate like elements throughout the specification.

An embodiment of the invention is an aerostatic lead screw actuator (ALSA) assembly with high stiffness and near-frictionless motion. An exemplary aerostatic lead screw actuator is a near-frictionless apparatus that converts rotary motion of a lead screw to linear motion of an aerostatic nut. Within this system, near-frictionless motion is achieved by providing all moving joints to not be in contact through a series of air bearings. The air bearings operate by pressurized air generating a lift-off force to form an air gap between two mechanical bodies. Exemplary ALSAs virtually eliminate stick-slip friction and backlash.

An exemplary embodiment provides a porous-restriction air bearing. This type of restriction is a more stable air bearing configuration compared to orifice-restricted air bearings.

An exemplary manufacturing process is also simplified with the use of insertable porous materials. Insertable porous materials (porous media inserts) allow porous media to be easily integrated within the helical nut geometry, as opposed to manufacturing an aerostatic nut using a solid block of porous material.

Also, an exemplary integrated lapping system and an exemplary flexible seat for the porous media inserts compensate for error in the air gap and allow for lower tolerances to be set on the manufactured components, thereby lowering costs.

As shown in FIGS. 1-4, 8, and 9, an apparatus according to an exemplary embodiment of the invention provides an aerostatic nut 10 for an aerostatic lead screw actuator, in which a fluid (e.g., a pressurized gas such as air) can be fed to generate a non-contact interface between the nut 10 and thread flanks of a lead screw 4.

The aerostatic nut 10 includes a housing 12 having a series of openings 16 disposed therein in a helical pattern. The housing 12 further includes an inlet 14 for a fluid, such as air, and a fluid interconnection between each of the series of openings 16 and the inlet 14. This fluid interconnection or fluid interconnections preferably allow substantially uniform fluid (e.g., air) pressure to be applied to each of the series of openings 16 via the inlet 14. In an exemplary aerostatic nut 10, this is provided by a helical plenum chamber 20 disposed within the housing 12.

The openings 16 are disposed on surfaces of the helical plenum chamber 20 in a helical pattern. The helical plenum chamber 20 fluidly interconnects the openings 16 with the inlet 14 such that uniform or substantially uniform air pressure is provided to each of the openings 16.

To provide a restriction for the air bearings, each of the openings 16 is covered by an insertable porous media 30, as shown in FIG. 1 and in other figures.

In an exemplary embodiment, the porous media 30 is a disk, and the openings 16 are generally circular in shape, though various other shapes are possible for the disks and/or openings.

A non-limiting exemplary porous media 30 may be a graphite porous media. The porous media 30 can be inserted in a suitable manner in the openings 16 and secured thereto using methods such as, but not limited to, adhering.

An O-ring 34 is provided at the outer surface of the porous media 30 to prevent air from passing through the outer surface of the porous media installed in the opening 16.

Figure 8:
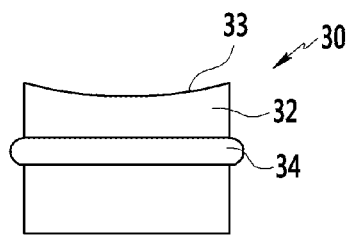
FIG. 8 shows a graphite disk insert after an exemplary rough lap, according to an embodiment of the invention.

The porous media 30 may be configured such as via one or more lapping processes, examples of which are described below and shown in the lapping module of FIGS. 3 and 4, and the porous media of FIGS. 8 and 9, to conform the porous media 30 to the threaded surface 5 of the lead screw 4.

To account for manufacturing variances in the threaded surface 5 of the lead screw 4, the openings 16 preferably include a flexible seat on which the inserts are disposed. This seat, in a non-limiting exemplary aerostatic nut, can be provided by a flange formed into the housing, such as within the opening.

An exemplary aerostatic lead screw actuator (ALSA) 1 includes an aerostatic nut, such as the aerostatic nut 10 described herein, and a lead screw 4 coupled thereto.

The lead screw 4 includes a lead screw thread having a surface 5 that, when the lead screw 4 is coupled to the aerostatic nut 10, is separated from the aerostatic nut 10 by an air gap 22 (refer to FIG. 1) provided by the openings 16 and the porous media inserts 32. In a non-limiting exemplary embodiment, the thread profile of the lead screw 4 may be substantially trapezoidal.

A suitable driver, such as, but not limited to, a motor 6, may be provided for rotating the lead screw 4 and actuating the lead screw actuator 1.

Figure 3:
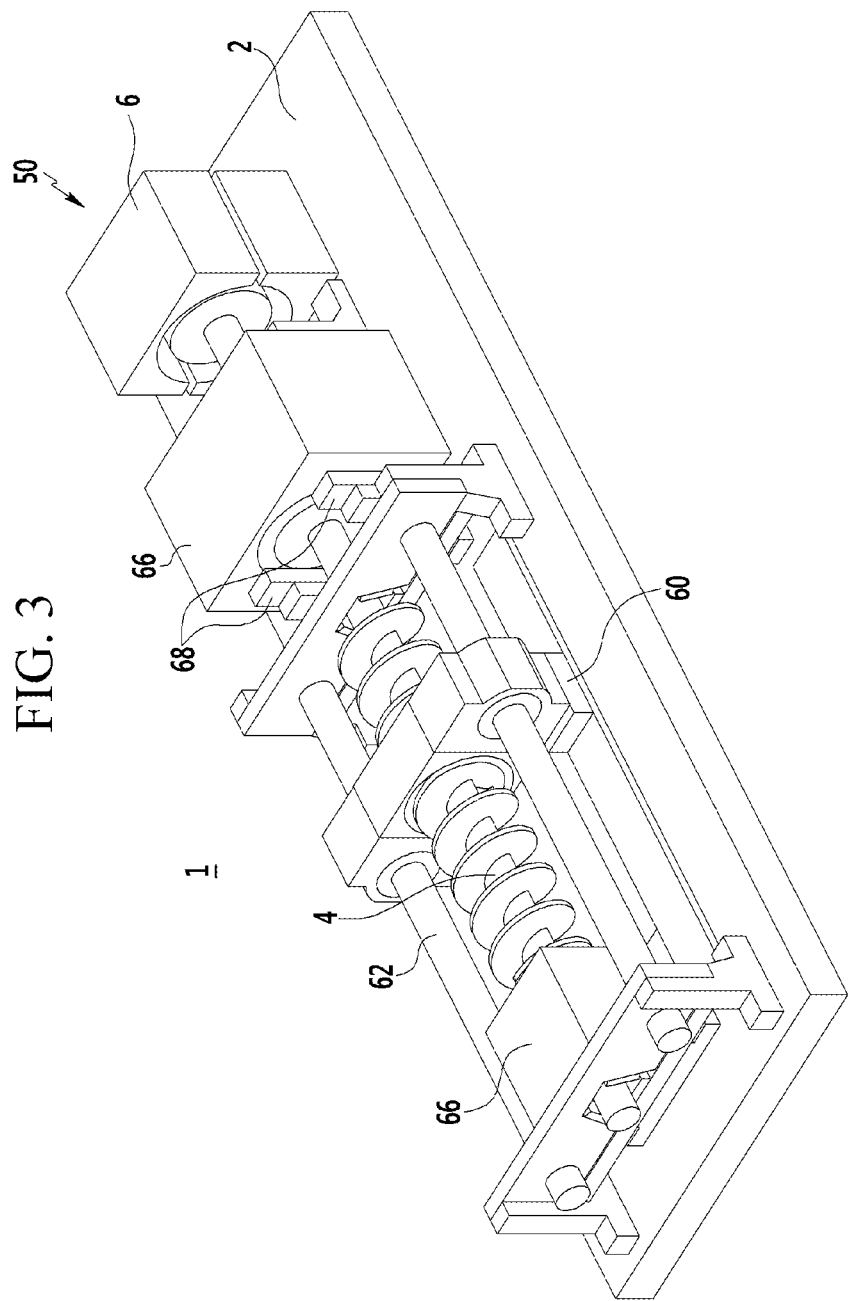
FIG. 3 shows an exemplary aerostatic lead screw actuator assembly with lapping module, according to an embodiment of the invention.
Figure 4:
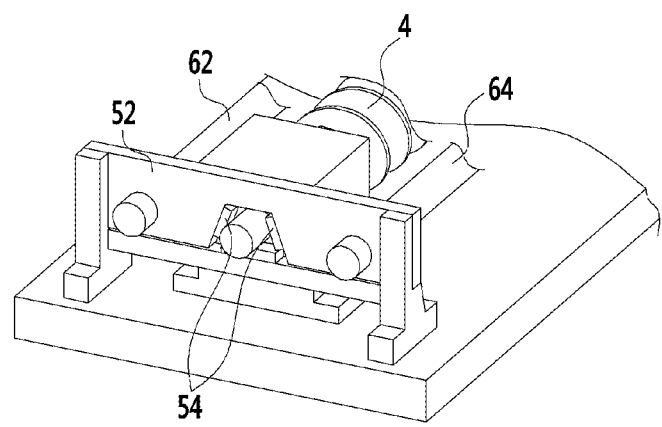
FIG. 4 shows a portion of the aerostatic lead screw actuator with a lapping module of FIG. 3.
Figure 5:
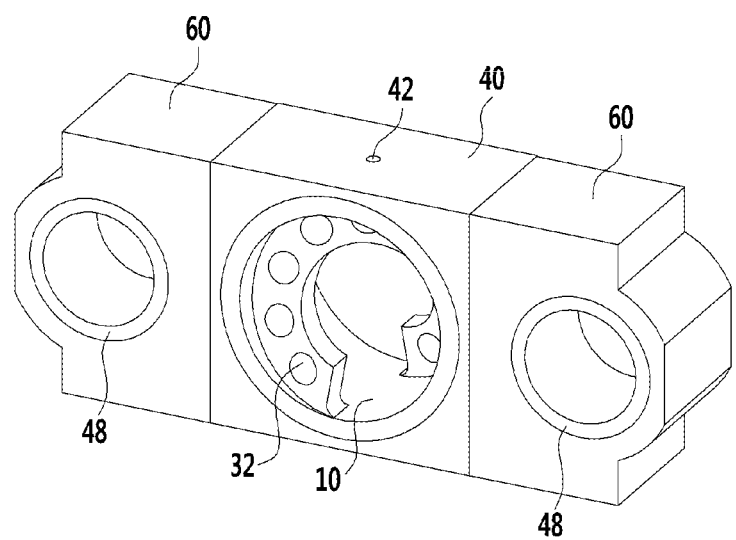
FIG. 5 shows a portion of the aerostatic lead screw actuator of FIG. 3.

Referring to FIGS. 3 to 5, an exemplary aerostatic lead screw actuator 1 includes a base 2, a lead screw 4 rotatably coupled to the base 2, and an aerostatic nut 10 coupled to the lead screw 4, e.g., so that the axis of the lead screw 4 passes through an opening of the aerostatic nut 10.

The lead screw 4 includes the threaded surface 5, which is separated from the aerostatic nut 10 by the air gap 22 (refer to FIG. 1). An actuator such as, but not limited to, a motor 6, is coupled to the base 2 to actuate (e.g., rotate) the lead screw 4.

In an exemplary assembly, to improve stiffness, first and second guide rails 62 and 64 are coupled to the base 2 and disposed on opposing sides of the lead screw 4.

Referring to FIG. 5, an outer surface of the aerostatic net 10, which is circular in the radial direction of the axis of rotation of the aerostatic nut 10, is formed to be surrounded by a rectangular-shaped nut housing 40. A nut housing air inlet 42 is formed at a portion of the nut housing 40 to provide air into the plenum chamber 20 of the aerostatic nut 10.

Extensions, e.g., outriggers, are fixedly coupled to either side of the nut housing 40. Air bushings 48 are coupled to the outriggers 60. The opening is provided at the center of each of the air bushings 48. The first and second guide rails 62 and 64 are inserted through openings in each of the extensions, such that axes of the first and second guide rails 62 and 64 and the axis of the lead screw 4 are coplanar or substantially coplanar. The lead screw 4 can be disposed in suitable bushings, e.g., a support bushing 66 and a thrust busing 68 coupled to the base 2 for rotation therein.

An exemplary aerostatic nut 10 for a lead screw actuator 1 may generally include a housing 12, porous graphite disk inserts 32, a helical plenum chamber 20, and a flange 18.

The porous graphite disk inserts 32 allow a method of incorporating a porous material in a helical pattern while avoiding processing difficulties of forming a solid porous body in a helical thread shape.

The exemplary helical plenum chamber 20 interconnects all of the porous graphite disk inserts 32 (e.g., fluidly interconnects the openings covered by the disk inserts) to the same inlet pressure to ensure uniform air flow to each of the porous graphite disk inserts 32.

An aerostatic lead screw actuator 1 according to an exemplary embodiment includes the porous graphite disk inserts 32 arranged in a helical pattern in the housing 12 of the aerostatic nut 10 against (in close proximity to) a modified trapezoidal thread of the lead screw 4 to create multiple simultaneous air bearing surfaces.

The housing 12 of the aerostatic nut 10 includes the helical plenum chamber 20 that interconnects all porous graphite disk inserts 32 to the same air supply pressure, and the flange 18 to support the operation of the porous graphite disk inserts 32.

The air bearing surfaces create a lift-off force and form an air film between the aerostatic nut 10 and the threads of the lead screw 4 to provide near-frictionless motion and high axial stiffness.

The porous media disk inserts 32 are preferably disposed on the flange 18 in each of the openings 16, allowing compensation for manufacturing imperfections in the lead screw 4. A plate spring 36 corresponding to the high and low spots on the lead screw flank is provided between the porous media disk inserts 32 and the flange 18 to maintain a more precisely controlled air gap.

A precision lapping module 50 is also incorporated within an exemplary assembly design to enable consistent lapping of the graphite disk inserts 32 during manufacture of the actuator. The exemplary aerostatic nuts 10 provide significant improvements over existing aerostatic lead screw actuators.

With this exemplary configuration it is possible to obtain relatively high stiffness. In some exemplary embodiments, 50 N/micron is achievable with engagement with a single thread revolution. A straightforward system of coupling more than one aerostatic nut can lead to even higher stiffness values as well.

An exemplary ALSA provides near-frictionless motion with sub-micron accuracy, a stiffness of 50 N/μm (at a supply pressure of 120 psi), a low inlet air pressure (e.g., <827 kPa), and a travel length of 50 mm. To allow economical manufacturing of an ALSA that provides static stiffness of at least 50 N/μm with sub-micron positioning accuracy across the entire length of travel, particular exemplary ALSAs use porous-restricted graphite air bearings in conjunction with a precision ground lead screw.

Features of particular exemplary ALSAs will now be discussed. Four significant evaluation parameters for an ALSA include friction torque, stiffness, air pressure, and travel length. These performance parameters for an ALSA are often evaluated based on the desire to accommodate high dynamic cutting forces while maintaining sub-micron actuator accuracy.

Friction torque: Positioning accuracy of ALSAs is highly dependent on the inherent friction in the actuator. Tolerances on micro-scale parts are typically in the range of 1-3 μm. For an exemplary ALSA according to embodiments of the present invention, target accuracies are provided in the sub-micron range. To achieve these micro-scale accuracies, stick-slip friction should be nearly eliminated in exemplary ALSAs; friction can be considered negligible once a torque of 0.1 N-m can overcome all inherent friction within the actuator.

Stiffness: In micro-machining operations, deflection has a strong impact on the surface roughness and accuracy of a part. In a study discussed in Ellicott et al., "Machinability Investigation of Micro-Scale Hard Turning of 52100 Steel," Transactions of NAMRI/SME, Vol. 37, pp. 143-150, 2009, cutting forces having magnitudes between 5-12 N were seen during the hard turning of miniature bearings (HRC 65). In order to ensure deflections remained below 200 nm under most cutting conditions, a stiffness of 50 N/μm is significant.

Air Pressure: Air compressors in factory settings typically peak at approximately 827 kPa (120 PSI). This provides an exemplary limiting factor for inlet pressures that can be supplied to an exemplary ALSA.

Travel length: The travel requirements for an mMT are much smaller than those of a typical macro-scale machine tool. A travel length of 50 mm is chosen for an exemplary ALSA application.

FIG. 1 shows an exemplary air bearing according to an embodiment of the invention.

Within an aerostatic nut 10, air enters into a plenum chamber 20, which is coupled (e.g., connected) to a porous media 30, such as porous graphite disk inserts 32. This porous media 30 acts as a restrictor that controls the air flow.

The porous graphite disk inserts 32 are mechanically fixed to a flange 18. In the exemplary embodiment, a relatively stiff mechanical plate spring may be provided between the porous graphite disk inserts 32 and the flange 18 to keep a consistent downward force on the insert. As another example, flexure could be provided by a flange formed in the nut housing instead of the plate spring, so as to deflect corresponding to high/low spots on the lead screw, increasing the air gap tolerance. Air flow through the porous media 30 (e.g., graphite disk inserts 32) will reach the critical air bearing surface and create a lift-off force forming an air gap 22 between the porous media 30 and the surface 5 of a lead screw.

Because of the porous nature of the material (e.g., graphite disk inserts 32), air flow is also distributed evenly across the entire air bearing surface. The balance between the air flow lift-off force and the downward force provided by the plate spring 36 will generate the air gap 22 which provides the necessary stiffness for the exemplary ALSA 1

Figure 2:
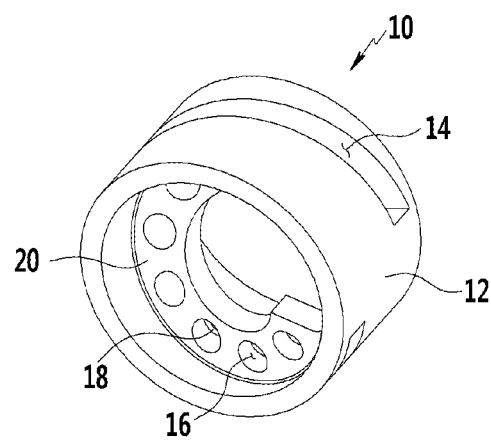
FIG. 2 shows an exemplary aerostatic nut housing according to an embodiment of the invention.

FIG. 2 shows an exemplary housing 12 of the aerostatic nut 10 according to an embodiment of the present invention, illustrating an exemplary approach to incorporate porous graphite media 30 (or other suitable porous media) into an aerostatic nut 10.

The housing 12, as non-limiting examples, may be manufactured from aluminum, steel, or stainless steel.

In order to obtain bidirectional stiffness, disk inserts 32 on opposing faces in the exemplary aerostatic nut 10 are paired.

In the exemplary aerostatic nut 10 in FIG. 2, there are nine pairs of disk inserts 32 (that is, two openings on opposite sides of the nut) that provide the porous media 30, and thus in this example, there are nine openings on each side of the aerostatic nut 10.

These pairs of disk inserts 32 are held against the flanks of the lead screw thread and act as a medium for air to travel through to create the air gap 22 between the lead screw 4 and the aerostatic nut 10.

Each disk insert 32 is supported by a flange 18.

The plate spring 36 is provided between the porous media disk inserts 32 and the flange 18 to maintain a more precisely controlled air gap. The plate spring 36, which can be supported by a flange 18 formed in the housing 12, will deflect corresponding to the high and low spots on the lead screw 4, increasing the air gap 22 tolerance.

In the exemplary aerostatic nut 10, the porous disk inserts 32 are all interconnected by a helical plenum chamber 20 that supplies the same (or substantially the same, e.g., within 402 and 420 kPa) inlet pressure to each porous disk insert 32.

The exemplary aerostatic nut 10 design shown in FIG. 2 enables porous graphite disk inserts 32 to be assembled to follow the contour of the thread profile.

To allow the surfaces of the porous graphite disk inserts 32 to mate with the helical surface 5 of the lead screw 4 such that the air gap 22 is maintained in a range of several microns, exemplary embodiments provide a lapping module 50 that is integral to the ALSA 1.

FIG. 3 shows an exemplary ALSA design including an exemplary integrated lapping module that is included in the exemplary ALSA 1 design to provide consistent lapping across all graphite disk inserts. FIG. 4 more clearly depicts particular components of the exemplary lapping module. Near-frictionless motion can be achieved because all moving contacts are supported by air bearings in this exemplary design.

In the exemplary lapping module 50, first and second guide rails 62 and 64 are held by a set of spreader bars 52 that reference two shaft portions of the lead screw 4.

These spreader bars 52 align the first and second guide rails 62 and 64 such that the axes of the first and second guide rails 62 and 64 and that of the lead screw 4 are on the same plane.

Once aligned, a nut housing 40 of the aerostatic nut 10 is attached to the first and second guide rails 62 and 64 through two lapping outriggers 60 that constrain the tilt and yaw during lapping operations.

After manufacture, the first and second guide rails 62 and 64 will also provide additional radial stiffness to the exemplary actuator during normal operation. A support bushing 66 and a thrust bushing 68 are provided on the lead screw 4 to rotatably support the lead screw 4.

In a non-limiting exemplary ALSA design, the motor is an Aerotech frameless torque motor, and all of the bushings are New Way air bearings, to keep the actuator in a non-contact state.

Assembly of the exemplary ALSA preferably involves the following steps.

1. The lapping outriggers 60 are initially slid onto the first and second guide rails 62 and 64, which are then shrink-fitted into the spreader bars 52. This subassembly will be positioned on top of the ALSA 1 using segments of the lead screw 4 shaft as reference surfaces.

2. The aerostatic nut 10 is then slid onto the lead screw 4.

3. Precision spacers 54 are used to offset the spreader bar 52 such that the axes of the first and second guide rails 62 and 64 align with that of the lead screw 4 (points A and B in FIG. 4).

4. Once the lapping module 50 is aligned properly, the spreader bars 52 are anchored to a base 2 and the precision spacers 54 are removed.

5. The aerostatic nut 10 is then attached to the outriggers 60 through dowel pins that are press-fitted into holes after alignment and assembly of the entire ALSA 1 (see FIG. 5).

Figure 6:
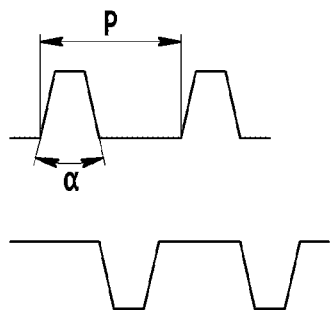
FIG. 6 shows an exemplary modified trapezoidal thread profile for a lead screw, according to an embodiment of the invention.

The thread geometry and the profile tolerance are two significant design parameters for the exemplary lead screw 4. Since the exemplary air bearing operates on the flank of the screw, the thread angle of the screw influences both the radial and axial stiffness. For the exemplary actuator, the axial stiffness is a significant parameter because it directly influences the positioning accuracy of the system. Radial stiffness can be obtained in other ways, such as by providing a set of guide rails. Ideally, a square thread should be employed to achieve the maximum axial stiffness in the ALSA. However, the 90° thread angle makes the grinding process expensive. Therefore, in an exemplary embodiment, a trapezoidal thread form with a 25 mm pitch (P) and a 30° thread angle ($\alpha$) is provided. The geometry of the exemplary thread profile is depicted in FIG. 6. However, the thread profile is not limited to the particular thread profile shown. For example, the thread profile can be any profile such that the aerostatic nut can fit between the threads. Non-limiting examples include acme, trapezoidal, square, etc.

It is helpful to maximize the spacing between the threads so that the porous graphite disk inserts 32 could be incorporated into the housing 12 of the aerostatic nut 10. In the exemplary profile shown in FIG. 6, this is accomplished by increasing the distance between the threads.

Air Flow Calculations: With the use of porous graphite as an exemplary air flow restriction media, there are two major parameters that can be controlled to influence the air bearing performance, viz., inlet pressure and permeability. The inlet pressure is the pressure applied to each of the porous graphite disk inserts. The permeability is a measure of the ability of a porous material to transmit fluids. These two parameters will have an effect on the overall stiffness of the aerostatic nut. During an exemplary operation, the air pressure is kept under 120 PSI for typical factor settings.

In order to calculate the inlet pressure and permeability values that produce the required static stiffness of the exemplary ALSA, air flow through the porous material and air flow through the air gap is first determined. Air flow analysis is performed on a singular porous graphite disk. This will enable the generation of the lift-off force and stiffness plots for each individual porous disk in the exemplary aerostatic nut.

Darcy's model calculates the flow through porous materials, as $$\dot{m} = \frac{A_p k_y (P_2^2 - P_1^2)}{2\mu \Re TH} \quad (1)$$

where $\dot{m}$ is the mass flow rate, $A_p$ is the cross-sectional area, $k_y$ is the permeability constant, P 2 and P 1 are the respective inlet and outlet pressures, $\mu$ is the viscosity of air, $\Re$ is the gas constant for air, T is the ambient temperature (300K), and H is the thickness of the porous media.

Once the mass flow rate thorough the porous media is known using Eq. (1), the 1D generalized flow method developed by Plante et al., "A Design Model for Circular Porous Air Bearings Using the 1D Generalized Flow Model," Precision Engineering, Vol. 29, No. 3, pp. 336-346, 2005, is used to arrive at the lift-off force for a given air-gap. The model developed by Plante et al. is based on differential shell elements that model flow behavior within the air gap between the porous media and the guide surface for a given fly height/air gap. Once lift-off force is calculated, stiffness can be determined by the following equation:

$$\text{stiffness} = \frac{dF}{dh} \quad (2)$$

where F is the lift-off force and h is the fly height.

This model was used to parametrically study the effect of inlet pressure on lift-off force and stiffness.

Figure 7:
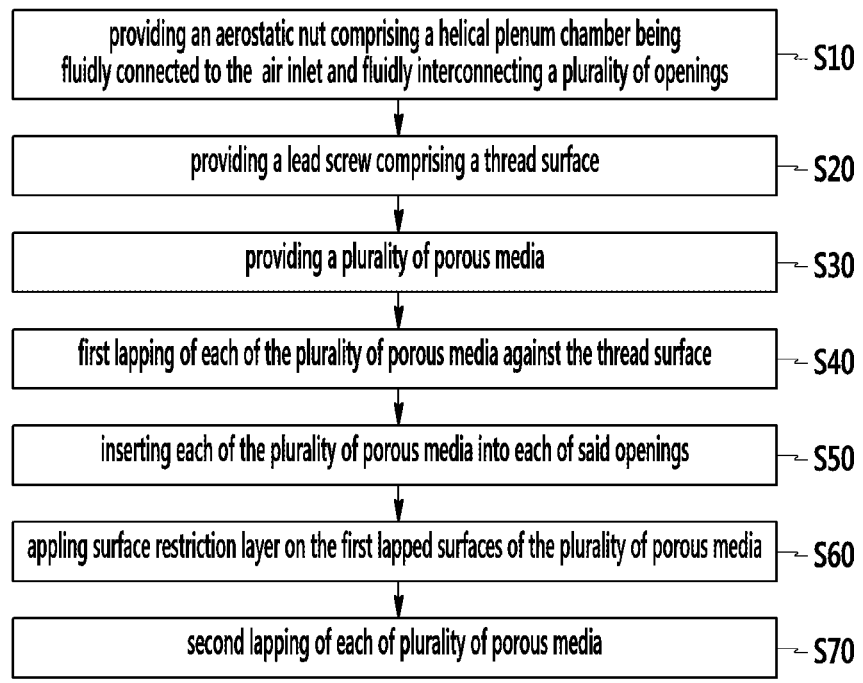
FIG. 7 shows a flowchart of a method for assembling an aerostatic air bearing.

Generalized Manufacturing Process: Given the exemplary ALSA using porous air bearings, a generalized exemplary manufacturing process includes the following steps (see FIG. 7).

Step 1: Manufacture basic components including the housing 12 of the aerostatic nut 4, the precision ground lead screw 4, and the porous media 30 with appropriate profile tolerances for aerostatic application (S10, S20, S30).

Step 2: Rough lapping operation on porous graphite disk inserts 32 against the lead screw 4 to mate the graphite disk inserts 32 to the helical thread form (S40).

Step 3: Pot the graphite disk inserts 32 with the plate spring 36 into the opening 16 of the aerostatic nut 10 to ensure a tight fit when sliding the aerostatic nut 10 onto the lead screw 4 (S50).

Step 4: Apply a surface restriction layer on roughly lapped surfaces of the graphite disk insets 32 (S60).

Step 5: Perform final lapping operation with appropriate lapping compound (S70).

Considerations for the manufacture of the exemplary aerostatic nut 10 housing 12 and ground lead screw 4 are described above. The additional exemplary manufacturing steps will now be described in more detail. The lapping module shown in FIGS. 3 to 5 can be used during the manufacture of the exemplary ALSA.

Rough Lapping Operation (S40): A rough lapping operation on the graphite disk inserts 32 ensures that the critical air bearing surfaces roughly match the geometric profile of the thread of the lead screw 4. Because the exemplary thread helical form follows a trajectory, the surfaces of the graphite disk inserts 32 should have some curvature 33, as seen by example in FIG. 8. A rough lap is used in an exemplary manufacturing operation because the graphite disk inserts 32 initially will not slide onto the thread because their flat surfaces do not match the curvature of the thread. Therefore, during the rough lap, only one side of the aerostatic nut 10 is lapped at a time.

During the rough lapping, the lead screw 4 is coated with a grinding compound. A rough grinding compound, e.g., garnet with a 4 um grit size, may be used.

Then, during the rough lapping, the plurality of porous graphite disk inserts are roughly lapped by sliding of the aerostatic nut 10 on the lead screw 4 in the state that the rough grinding compound is applied and the graphite disk inserts is assembled in the nut housing 12. The graphite disk inserts 32 are potted inside the positioning holes 16 located in the exemplary aerostatic nut 10 housing 12 after the rough lapping operation (e.g., as shown in FIG. 9).

Once the exemplary ALSA is disassembled, each graphite disk inserts 32 is matched with its corresponding positioning hole 16 and oriented using alignment markers 56. However, measurement of material removal during the rough lapping operation is difficult due to both the curved surface of the graphite disk inserts 32 and the lack of a reference surface.

During the exemplary rough lapping operation, the graphite disk inserts 32 are "over-lapped" such that there is significant backlash in the aerostatic nut 10. The plate spring 36 is positioned between the back side of the graphite disk inserts 32 and the flange 18 to eliminate any backlash in the aerostatic nut 10 and to ensure a tight fit such that final lapping may occur.

Figure 9:
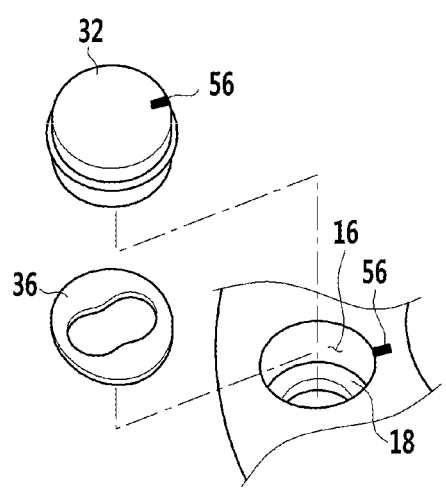
FIG. 9 shows exemplary potting of graphite disk inserts after exemplary rough lapping, according to an embodiment of the invention.

FIG. 9 shows the exemplary aerostatic nut housing 12 configuration before the graphite disk inserts 32 are potted in their respective holes. The graphite disk inserts 32 are potted in place in an exemplary method by adhering the graphite disk inserts 32 to the inside of the hole 16, for instance using an epoxy (S50).

Surface Layer Restriction S60: Permeability of the porous graphite disk insets 32 is one important parameter that affects the stiffness of the exemplary ALSA. It is helpful to control this parameter in order to ensure correct volumetric air flow into the ALSA. The permeability is directly correlated to the porous restriction of the graphite material being used. For an air bearing application, it is important to restrict the air flow to ensure stable bearing operation. Therefore, the exemplary porous material will act as a damper against allowing too much air to flow into the gap when the air bearing encounters defects in the guide surface.

In an exemplary ALSA manufacture, three general sources of restriction may be encountered: particle contamination, lapping-induced burrs, and resin impregnation. Particle contamination in the porous matrix is likely unavoidable (e.g., due to ambient conditions). However, ultrasonic washing of the porous graphite disk inserts can be used to eliminate the majority of blockages caused by the contaminants. Another source of restriction may be encountered during lapping operations, in that after lapping, graphite debris and burrs may fold over and smear across the pores and block the air flow through the porous graphite disk inserts.

To address particle contamination and lapping-induced restriction, an Example 5 method to control permeability uses a surface layer restriction technique, such as the technique disclosed in Rasnik et al., "Porous Graphite Air-Bearing Components as Applied to Machine Tools," Society of Manufacturing Engineers, Technical Report MRR74-02, 1974. In this technique, a resin dissolved in a solvent is applied to the critical air bearing surface and drawn into the pores through vacuum to obstruct the air flow. The air flow is measured, and depending on whether the measured value is greater than or less than the target air flow, either more resin is applied or a solvent is used to wipe away some of the preexisting lacquer already bonded to the surface. This method is repeated until the desired flow rate is achieved. By engineering this restriction, the porous material will act as a damper preventing too much air to flow into the air gap when the air bearing encounters defects in the guide surface.

Final Lapping Operation S70: Final lapping occurs after the nut 10 is slid onto the lead screw 4 and the stage is fully assembled with the exemplary precision lapping system.

During the final lapping, the plurality of porous graphite disk inserts may be precisely lapped by sliding of the aerostatic nut on the lead screw freely in the state that a grinding compound which is denser than the grounding compound used in the rough lapping, e.g. iron oxide with a 3 um grit size or red rouge with a 1 um grit size, is applied.

Final lapping ensures that both sides of the aerostatic nut 10 have matching surface profiles and the correct air gap with the lead screw 4 flank. Once the friction torque requirement of 0.1 N-m is achieved, the stage is disassembled and cleaned before final assembly. After the ALSA is completed, the exemplary lapping module 50 preferably becomes part of the final actuator to act as a radial guide to increase stiffness of the entire actuator.

A porous-restricted air bearing configuration and manufacturing process are provided according to embodiments of the present invention and incorporated into an aerostatic lead screw actuator design. The exemplary ALSA design, including the porous media disk inserts, helical plenum chamber, and flange flexure in the exemplary aerostatic nut generate multiple simultaneous air bearing surfaces to provide frictionless motion.

Porous-restricted air bearings feature an exceptionally even distribution of air flow across the entire air bearing surface, which increases the stability of the air bearing. Inlet pressure, the number of graphite disk inserts, and graphite disk insert permeability can be configured in exemplary embodiments to ensure suitable stiffness requirements and stable operation.

The multiple discrete air bearing porous media inserts virtually eliminate stick-slip friction and backlash, and provide sufficient stiffness to perform in mMT tools while still allowing for looser manufacturing tolerances.

An exemplary generalized manufacturing process for the cost-effective ALSA includes rough lapping, potting porous media disks, surface layer restriction, and final lapping.

A precision lapping module is integrated into the exemplary ALSA to provide consistent lapping across the face of all porous graphite disk inserts.

A precision lapping module is integrated into the exemplary ALSA to provide consistent lapping across all porous graphite faces.

The guide rails within the exemplary lapping module provide additional radial stiffness to the actuator during normal operation as well. Exemplary lapping processes compensate for manufacturing variation, allowing easier control of the air bearing gap, and allowing looser (and thus less expensive) manufacturing tolerances. The ability of the air bearing inserts to move slightly to compensate for manufacturing variation also allows looser manufacturing tolerances. Exemplary aerostatic lead screw actuator designs are particularly suitable for high performance machine tools.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An aerostatic air bearing, comprising:
   an aerostatic nut; and
   a lead screw coupled to said aerostatic nut,
   wherein said aerostatic nut comprises:
      a housing having an air inlet disposed therein;
      a helical plenum chamber disposed in said housing, said helical plenum chamber being fluidly connected to the air inlet and fluidly interconnecting a plurality of openings, said openings being disposed in a helical pattern; and
      a plurality of porous media, each of said porous media being disposed in one of the plurality of openings respectively, and
   wherein said lead screw comprises a threaded surface separated from each of the plurality of porous media.

2. The aerostatic air bearing according to claim 1, wherein the plurality of openings are formed as pairs on the opposing faces of the aerostatic nut.

3. The aerostatic air bearing according to claim 1, wherein each of the plurality of porous media is configured to have a disk shape.

4. The aerostatic air bearing according to claim 1, wherein each of the plurality of openings is configured to have a circular shape.

5. The aerostatic air bearing according to claim 1, wherein each of the plurality of porous media is formed of a graphite material.

6. The aerostatic air bearing according to claim 1, wherein each of the plurality of openings includes a seat on which each of the plurality of porous media is disposed.

7. The aerostatic air bearing according to claim 6, wherein the seat includes a flange formed in each of the plurality of openings.

8. The aerostatic air bearing according to claim 7, wherein the flange is flexible.

9. The aerostatic air bearing according to claim 7, further comprising a plate spring provided between each of the plurality of porous media and the flange.

10. The aerostatic air bearing according to claim 1, wherein the thread profile of the lead screw includes a trapezoid shape.

* * * * *